(12) United States Patent
Wilson

(10) Patent No.: US 12,353,691 B1
(45) Date of Patent: Jul. 8, 2025

(54) SYSTEM AND METHOD FOR THE CREATION OF DYNAMIC MOVING BACKGROUNDS FOR MULTIPLE OPERATING SYSTEMS'S DESKTOPS CHANNELED THROUGH RECORDED OR LIVE VIDEO SOURCES

(71) Applicant: Robert Allen Wilson, Shawnee, KS (US)

(72) Inventor: Robert Allen Wilson, Shawnee, KS (US)

( * ) Notice: Subject to any disclaimer, the term of this patent is extended or adjusted under 35 U.S.C. 154(b) by 147 days.

(21) Appl. No.: 18/226,426

(22) Filed: Jul. 26, 2023

(51) Int. Cl.
  *G06F 3/04842* (2022.01)
  *G06F 9/451* (2018.01)
  *H04N 7/01* (2006.01)

(52) U.S. Cl.
  CPC .......... *G06F 3/04842* (2013.01); *G06F 9/452* (2018.02); *H04N 7/0122* (2013.01)

(58) Field of Classification Search
  CPC .................................................. G06F 3/048–05
  See application file for complete search history.

(56) References Cited

U.S. PATENT DOCUMENTS

| | | | | |
|---|---|---|---|---|
| 2012/0174034 A1* | 7/2012 | Chae | ................... | G06F 3/04883 715/835 |
| 2016/0291930 A1* | 10/2016 | Isherwood | ............ | G06F 3/0346 |
| 2016/0309230 A1* | 10/2016 | Li | ........................ | H04N 21/472 |
| 2023/0161168 A1* | 5/2023 | Li | ....................... | G06F 3/04817 345/8 |

FOREIGN PATENT DOCUMENTS

| | | | | | |
|---|---|---|---|---|---|
| CN | 109743464 A | * | 5/2019 | ......... | G06F 3/04817 |
| CN | 113849096 A | * | 12/2021 | ......... | G06F 3/04817 |

OTHER PUBLICATIONS

English Translation of CN109743464AI, published on May 10, 2019 (Year: 2019).*
English Translation of CN113849096AH, published on Dec. 28, 2021 (Year: 2021).*

* cited by examiner

*Primary Examiner* — Daniel Rodriguez
(74) *Attorney, Agent, or Firm* — Sandy Lipkin

(57) ABSTRACT

Systems and methods for the creation of Dynamic/Moving Backgrounds for multiple operating systems channeled through recorded or "live" video sources. The program provides a custom NSWindow subclass, using a borderless style mask. It then sets the level of that window to the 'lowest' possible depth, and shows it in all spaces, ignoring any windowing collection behavior. Once the window has been created. It sets the window video content using whatever video content the user specifies. System and methods make a determination of the Aspect Ratio of the selected video and the conversion of that Aspect Ratio to match the Aspect Ratio of the user's Display. Chosen video is displayed from a Private Internal Browser in full screen mode from the NSWindow.

1 Claim, 2 Drawing Sheets

SYSTEM AND METHOD FOR THE CREATION OF DYNAMIC MOVING BACKGROUNDS FOR MULTIPLE OPERATING SYSTEMS'S DESKTOPS CHANNELED THROUGH RECORDED OR LIVE VIDEO SOURCES

BACKGROUND OF THE INVENTION

Field of the Invention

The field of this invention relates generally to the field of computer and smart device apps, and more particularly toward a system and method for dynamically displaying backgrounds via graphical user interfaces.

Description of the Prior Art

Contemporary, advanced computing devices are commonly provided with advanced computing capabilities. The terms "computer" and "computing devices" as used herein broadly cover a wide range of computers (mobile, portable, and desktop, etc.). Enhanced performance characteristics—e.g., greater clock speed, bandwidth, RAM and efficiency of central processing units (CPUs) enable significant computing power and resources to be installed on personal communications devices, e.g., smart phones, tablets, portable computers and desktop units.

Computer users commonly customize their devices with personal touches, which can include background images. Such images can comprise photographs and various other content, which enhance users' visual experiences. Moreover, GUI background and screensaver content can be used for promoting commercial messages and demonstrating user identification with institutions, such as colleges and sports franchises for demonstrating fan loyalty.

Currently, such background and screensaver imagery include static content. The present invention enhances the user experience by providing dynamic background and screensaver imagery content.

Utilizing the superior performance characteristics of current generation microprocessors, dynamic content can be displayed in background and screensaver apps. Such dynamic content displays offer multiple advantages, including, but not limited to, security, surveillance and entertainment, all of which enhance utility and user experiences.

Graphical user interfaces or GUIs are becoming increasingly popular with computer users. It is generally accepted that computers having graphical user interfaces are easier to use, and that it is quicker to learn an application program in a GUI environment than in a non-GUI environment Heretofore there has not been available a system and method for dynamically displaying content with the advantages and features of the present invention. Currently, background and screensaver images are static, e.g., JPG, PNG, BMP, etc., that convey single moment-in-time messaging. Dynamic/Moving back grounds convey additional and continuing information or data while the User preforms work using his/her computer. Additionally, Dynamic/Moving back-grounds add a degree of aesthetics compared to static images in addition to a feeling of security from adequate, immediate and continual surveillance. There are multiple inventions that have been proposed in prior art regarding advancement in providing enhanced GUI to the users. However, the utility of these systems has not been seen in advance form and for specialized needs. The current invention proposes a system which provides a method for enhanced experience allowing enhanced user's visual experience while working on his/her computer by utilizing a Dynamic/Moving Background displayed through the operating system's desktop displaying recorded or "live" video sources. The current invention would be of benefit to anyone working on a computer or smart device. Another object of the present invention is to provide an "agnostic" app, which is adaptable to various present and future operating systems, platforms, modalities (e.g., digital and quantum).

It is the primary object of the instant invention to provide a system and method for automated Apple®, Windows® and Android® Operating Systems devices allowing a visual experience to users while working on his/her computer by utilizing a Dynamic/Moving Background for Apple® Mac and iOS, Windows® or Android® computers via recorded or "live" video sources.

It is a further objective of the instant invention to provide a system that provides Dynamic/Moving backgrounds and provides more visual input into the mind of a computer user by providing additional data with which the User can make decisions regarding the User's life and/or work.

It is a further the objective of the instant invention to provide a system which provides benefit to anyone working on an Apple®, Windows® and Android® Operating Systems devices, or smart device, from anywhere where internet access is available.

It is a further objective of the instant invention to provide a system which creates a custom NS Window subclass, using a borderless style mask. It sets the level of that window to the 'lowest' possible depth, and shows it in all spaces, ignoring any windowing collection behavior.

It is a further objective of the instant invention to create a system which provides the User with a Private Browser that is only accessible through the instant invention for the sole purpose of displaying a video in the background of the Desktop.

It is a further objective of the instant invention to make a command call to the selected video or I.P. Web Camera to determine the Aspect Ratio of the video output file. This invention will then compare that video's or I.P. Web camera's Aspect Ratio to the Aspect Ratio of the User's device Display.

It is a further the objective of the instant invention to determine that if the Aspect Ratios are different from the Display's, the instant system and method will change the Aspect Ratio on the source video file to match the Aspect Ratio on the User's display.

It is further objective of the instant invention to then activate or "run" the video source file on this Invention's Internal Web Browser and display it in full screen mode.

It is a further the objective of the instant invention to display the Internal Web Browser on the NSWindow.

It is a further objective of the instant invention to provide a system which is of a durable and reliable construction.

SUMMARY OF THE INVENTION

The basic embodiment of the present invention teaches a system to create and enhance a desktop computer user's visual experience while working on said desktop computer by providing a dynamic background view via recorded or "live" video sources comprising the steps of: running a dynamic content display system application wherein said dynamic content display system application creates an NSWindow subclass in a computer desktop using a borderless mask and placing said NSWindow subclass over a native desktop on said desktop computer; said dynamic content display system application sets said NSWindow to a lowest possible depth; said dynamic content display system application shows said NSWindow in all spaces while ignoring any windowing collection behavior; an end user selects a single available window via a settings interface in said dynamic content display system application wherein said dynamic content display system application settings interface includes one or more videos available via URL or IP address, said one more videos taken from the group comprising: movies, television shows, public web cameras, private web cameras; said dynamic content display system application communicates with said one or more videos as selected by said end user to determine said video's aspect ratio; said dynamic content display system application adjust said video's aspect ratio to match an aspect ratio of an internal web browser of said dynamic content display system application; said dynamic content display system application displays said selected video in a full screen mode; and said dynamic content display system application sets said internal web browser window content onto said NSWindow subclass.

BRIEF DESCRIPTION OF THE DRAWINGS

For a better understanding of the present invention, reference is to be made to the accompanying drawings. It is to be understood that the present invention is not limited to the precise arrangement shown in the drawings.

DETAILED DESCRIPTION OF A PREFERRED EMBODIMENT

Figure 1:
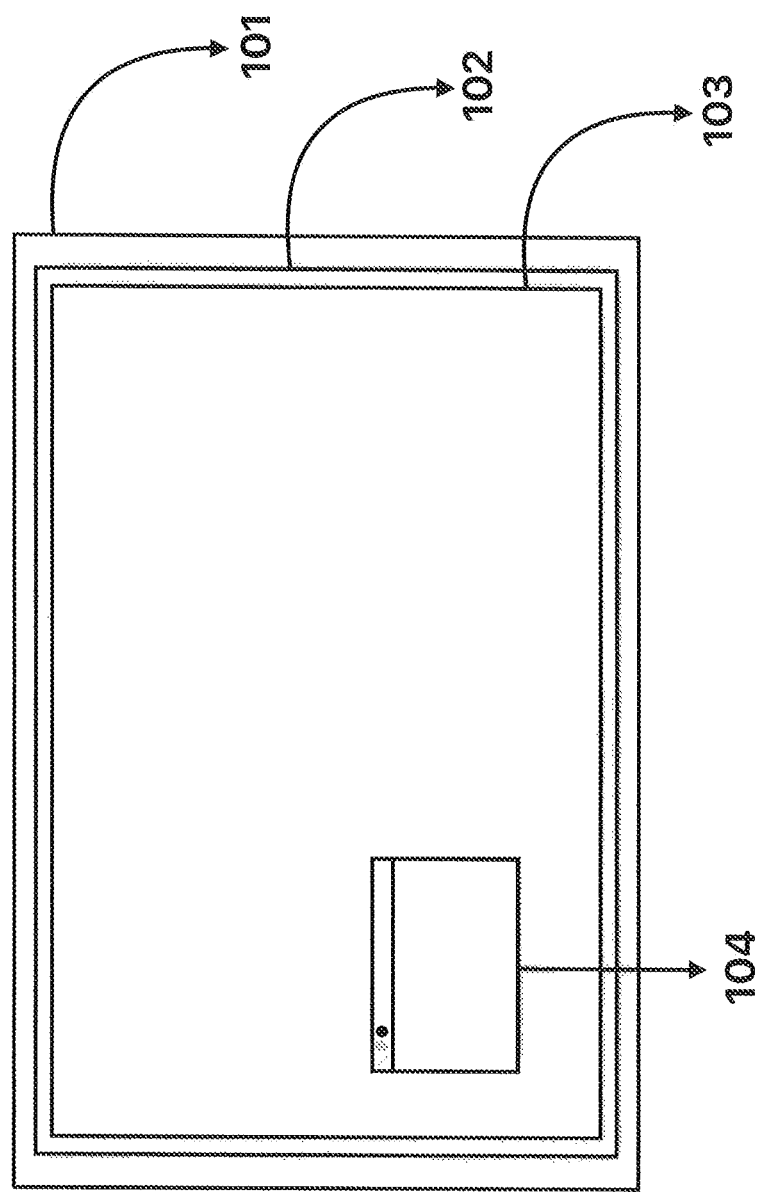
FIG. 1 shows the complete view of assembly as per preferred embodiments of the instant invention.

Turning to the drawings, the preferred embodiment is illustrated and described by reference characters that denote similar elements throughout the several views of the instant invention.

The preferred embodiment of the instant invention provides for a method to increase and/or enhance a computer user's visual experience while working on his/her computer by utilizing a Dynamic/Moving Background for Apple®, Windows® and Android® Operating Systems via recorded or "live" video sources.

Software creates a custom NSWindow subclass 102, using a borderless style mask on top of the Native Desktop 101. It then sets the level of that window to the "lowest" possible depth, and shows it in all spaces, ignoring any windowing collection behavior. Once the window has been created, it sets the window content using whatever content the user specifies 103, specifically MOV files and "Live" video feeds from internet sources including, but not limited to IP Web Camera feeds via their URL or static IP addresses. Currently, that content is hard-coded MP4 file or web address.

In the future, this content will be configurable using a settings interface accessed most likely via a menu status bar item. All of the above (101, 102, 103) reside below all Application Windows 104.

The NSWindow class defines objects known as windows that manage and coordinate the windows and application displays on the screen. A single NSWindow object corresponds to, at most, one onscreen window. The two principal functions of a window are to provide an area in which views can be placed and to accept and distribute, to the appropriate views, events the user instigates through actions with the mouse and keyboard.

The Dynamic Content Display System Application (DCDSA) creates an NSWindow subclass in Mac OS desktop. In other words, the DCDSA creates an additional window on the desktop in which to display something. It then places it over the original desktop and does so without adding a border. It then sets it to the lowest depth which means that it places it lower, i.e., further away from the front of the screen and tells the computer to not show other windows and to display in this screen.

The end user then selects an available video form a menu provided by the DCDSA after which the DCDSA then executes a command to look at the video's computer coding, specifically its properties to gather the Aspect Ratio (AR). The aspect ratio of a geometric shape is the ratio of its sizes in different dimensions. For example, the aspect ratio of a rectangle is the ratio of its longer side to its shorter side, i.e., the ratio of width to height when the rectangle is oriented as a "landscape". The aspect ratio is most often expressed as two integer numbers separated by a colon, e.g., xy, and less commonly as a simple decimal or fraction. The values x and y do not represent actual widths and heights but, rather, the proportion between width and height. As an example, 8:5, 16:10, 1.6:1, 8/5 and 1.6 are all ways of representing the same aspect ratio.

Different sources of videos have different aspect ratios. There is a wide variation in different ARs depending on the video source. If the AR of the video is not the same as the AR of the display, then the picture becomes distorted, looking stretched in one way or the other or both. The list of AR on televisions, and/or movies are easily adjusted to match that of the computer's display. In the case of web cameras, be they private or public, the AR is standard and easily displayed on any web browser. Web camera ARs rarely need adjustment to be viewed. Additionally, each of these cameras has a unique address so that each of them can be located on the Web.

There are two types of address Identifiers: 1) URL addresses, which are typically used for public web cams and come with an alphabetical sequence, such as www.example.com; and 2) IP addresses which are typically used for private web cams and come with a numeric sequence, such as 000.000.000. Anyone can look up a public (URL) Address using a search engine on the web. This is not the case, however, with private addresses which have numeric sequences that can be very long starting at 9 different sequential numbers and the numbers go up from there.

Accordingly, if one conducts a web search for a URL address, it will most likely be found and the user can click on it. The user can then see the output of that camera. Once the DCDSA has that address from the end user, it will insert it into the URL window of its internal browser and display the output of that public camera. This is not the case with private cams, however. Their unique identifiers are all private and only the owner can give that address to someone that they specifically and expressly choose. The correct combination of numbers is very complex and hard to break. Accordingly, if one does not have a private IP address that can be inputted into a browser, the user cannot see the output of that camera.

In the instant invention, the DCDSA has a built-in internal browser, such that, when requested, it can present an "IP address popup request" to the end user for their input, in order to get to a specific private web camera. Once the DCDSA has that address from the end user, it will insert it into the URL window of its internal browser and display the output of that private camera.

The DCDSA collects the AR from the selected video and compares it to the AR of the computer's display. It then adjusts the AR on the video and matches the computer's display AR. This usually happens with movies and television views. Videos from public and private web cameras are usually formatted to be viewed using a web browser already.

Accordingly, whether the desired video for desktop display is a movie, television show, public web camera or private web camera, the DCDSA then inserts that video into an internal web browser that is built into the DCDSA and plays it in full screen mode and places it in the NSWindow.

The benefit of having the DCDSA perform this function is to provide the end user with dynamic, i.e., moving, backgrounds that are specific to their wants and needs. Some examples of this would be: 1) watching one's favorite movie while working on another project; 2) watching a special television event "live" while working on another project; 3) watching a vacation scene while a family member or friend are present there where a public web cam is present while you are working on another project; and 4) watching one's children at daycare, while you are working on another project.

Figure 2:
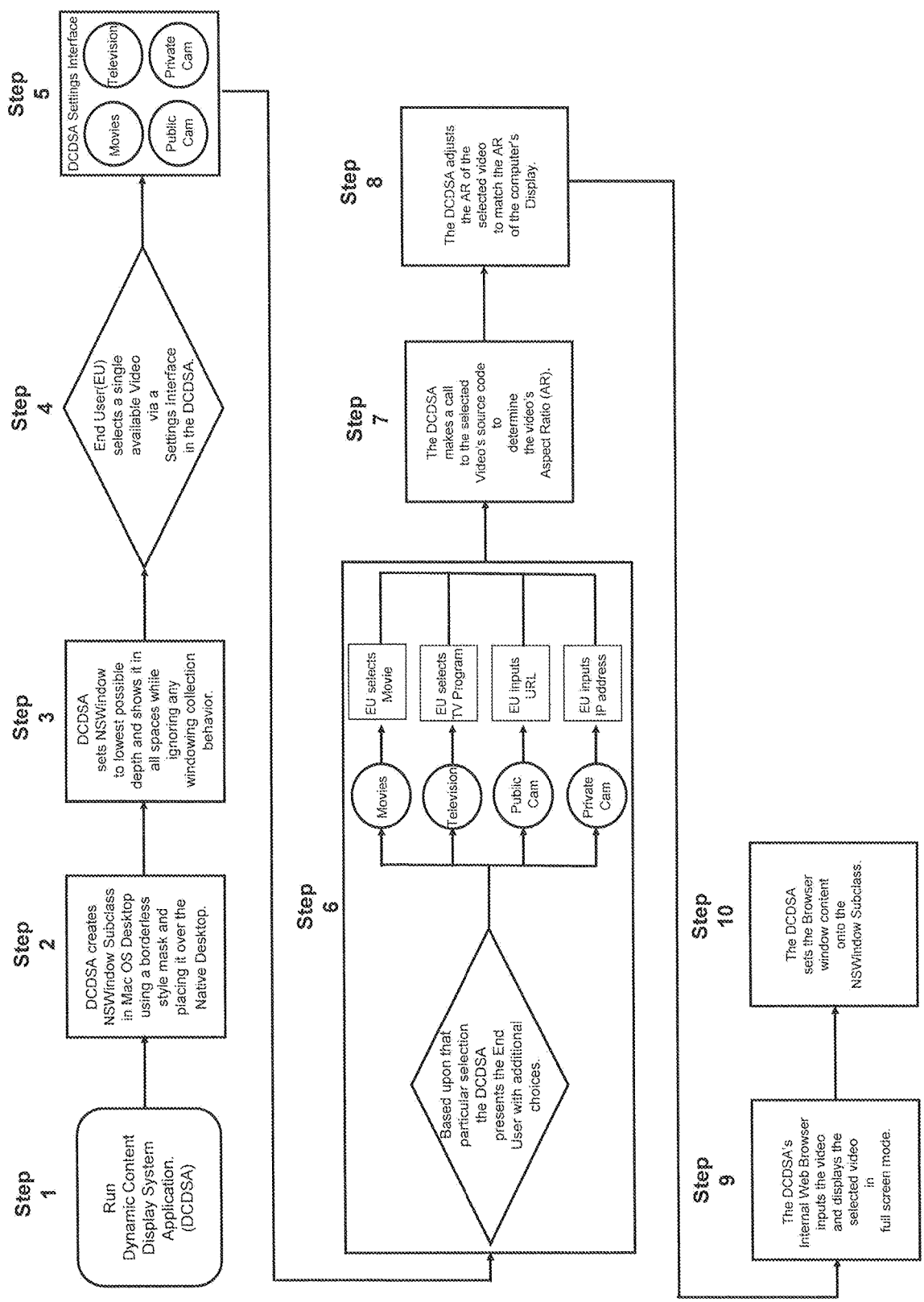
FIG. 2 shows a process diagram for the instant invention.

Following the flow chart (FIG. 2), Step 1 is where the Dynamic Content Display System ("DCDSA") starts to run. Step 2 is where DCDSA creates the NSWindow subclass in Mac OS desktop using a borderless style mask and placing it over the native desktop. Step 3 is where the DCDSA sets the NSWindow to the lowest possible depth and shows it in all spaces while ignoring any windowing collection behavior. Step 4 is where the end user selects a single available video via a settings interface in the DCDSA. Step 5 shows the DCDSA settings interface with the selections including, illustratively, movies, television, public cam and . . . private cam. Step 6 is where, based upon the particular selection, the DCDSA presents the end user with additional choices, such as, in the case of a movie selection, the end user selects the movie; in the case of a television selection, the end user selects the television program; in the case of a public cam selection, the end user inputs the URL; and in the case of a private cam, the end user inputs the IP address. Step 7 is where the DCDSA makes a call to the selected video source's code to determine the video's aspect ratio ("AR"). Step 8 is where the DCDSA adjusts the AR of the selected video to match the computer's display. Step 9 is where the DCDSA's internal web browser inputs the video and displays the selected video in full screen mode. Step 10 is where the DCDSA sets the browser window content onto the NSWindow Subclass.

The invention illustratively disclosed herein suitably may be practiced in the absence of any element which is not specifically disclosed herein.

The discussion included in this patent is intended to serve as a basic description. The reader should be aware that the specific discussion may not explicitly describe all embodiments possible and alternatives are implicit. Also, this discussion may not fully explain the generic nature of the invention and may not explicitly show how each feature or element can actually be representative or equivalent elements. Again, these are implicitly included in this disclosure. Where the invention is described in device-oriented terminology, each element of the device implicitly performs a function. It should also be understood that a variety of changes may be made without departing from the essence of the invention. Such changes are also implicitly included in the description. These changes still fall within the scope of this invention.

Further, each of the various elements of the invention and claims may also be achieved in a variety of manners. This disclosure should be understood to encompass each such variation, be it a variation of any apparatus embodiment, a method embodiment, or even merely a variation of any element of these. Particularly, it should be understood that as the disclosure relates to elements of the invention, the words for each element may be expressed by equivalent apparatus terms even if only the function or result is the same. Such equivalent, broader, or even more generic terms should be considered to be encompassed in the description of each element or action. Such terms can be substituted where desired to make explicit the implicitly broad coverage to which this invention is entitled. It should be understood that all actions may be expressed as a means for taking that action or as an element which causes that action. Similarly, each physical element disclosed should be understood to encompass a disclosure of the action which that physical element facilitates. Such changes and alternative terms are to be understood to be explicitly included in the description.

What is claimed is:

1. A system to create and enhance a desktop/laptop computer user's visual experience while working on said desktop/laptop computer by providing a dynamic background view via recorded or "live" video sources comprising:
   a computing device with an operating system, a central processing unit, memory, a display monitor and graphic user interface;
   a dynamic content display system application wherein said dynamic content display system application creates an NSWindow subclass on said computing device using a borderless mask and placing said NSWindow subclass over a native desktop on said computing device;
   wherein said dynamic content display system application sets said NSWindow to a lowest possible depth;
   wherein said dynamic content display system application shows said NSWindow in all spaces while ignoring any windowing collection behavior;
   wherein an end user selects a single available window via a settings interface in said dynamic content display system application wherein said dynamic content display system application settings interface includes one or more videos available via URL or IP address, said one or more videos taken from the group comprising: movies, television shows, public web cameras, private web cameras;
   wherein said dynamic content system application communicates with said one or more videos as selected by said end user to determine said video's aspect ratio;
   wherein said dynamic content display system application adjust said video's aspect ratio to match an aspect ratio of an internal web browser of said dynamic content display system application;
   wherein said dynamic content display system application displays said selected video in a full screen mode on said display monitor; and
   wherein said dynamic content display system application sets said internal web browser window content onto said NSWindow subclass.

* * * * *